United States Patent [19]

Wynne et al.

[11] 4,394,655

[45] Jul. 19, 1983

[54] BIDIRECTIONAL, INTERACTIVE FIRE DETECTION SYSTEM

[75] Inventors: John M. Wynne, Oak Ridge; William R. Vogt, Rockaway, both of N.J.

[73] Assignee: Baker Industries, Inc., Parsippany, N.J.

[21] Appl. No.: 243,401

[22] Filed: Mar. 13, 1981

[51] Int. Cl.[3] .......................... H04Q 9/00; G08B 23/00

[52] U.S. Cl. .......................... 340/825.36; 340/505; 340/511; 340/825.37; 340/593

[58] Field of Search .......................... 340/825.54, 870.24, 340/870.13, 505, 509, 510, 511, 514, 593, 825.36, 825.37

[56] References Cited

U.S. PATENT DOCUMENTS

| | | | |
|---|---|---|---|
| 3,518,628 | 6/1970 | Giel et al. | 340/825.54 |
| 3,735,396 | 5/1973 | Getchell | 340/505 |
| 4,006,460 | 2/1977 | Hewitt et al. | 340/511 |
| 4,206,449 | 6/1980 | Galvin et al. | 340/505 |
| 4,222,041 | 9/1980 | Von Tomkewitsch et al. | 340/505 |
| 4,287,515 | 9/1981 | Raber et al. | 340/510 |
| 4,311,986 | 1/1982 | Yee | 340/825.54 |
| 4,346,380 | 8/1982 | Monticelli et al. | 340/870.13 |

FOREIGN PATENT DOCUMENTS 2025670 1/1980 United Kingdom .

*Primary Examiner*—Donald J. Yusko
*Attorney, Agent, or Firm*—James J. Jennings, Jr.

[57] ABSTRACT

The signalling system disclosed herein transmits groups of pulses to a plurality of transponders, and each transponder recognizes its address in a particular group of pulses. The group of pulses can reset the system, command a transponder to accomplish a specific function, or command the transponder to do nothing. Information returned from the transponder includes a reference voltage, which can be compared in the controller to continuously determine the margin from alarm of an associated transducer. The transponder further provides a signal identifying itself, and pulse duration signals representing analog signals received from one or more transducers associated with the transponders. No end-of-line termination is required, and branching is possible at any point along the loop.

19 Claims, 10 Drawing Figures

TRANSPONDER 15

FIG. 1
(PRIOR ART)
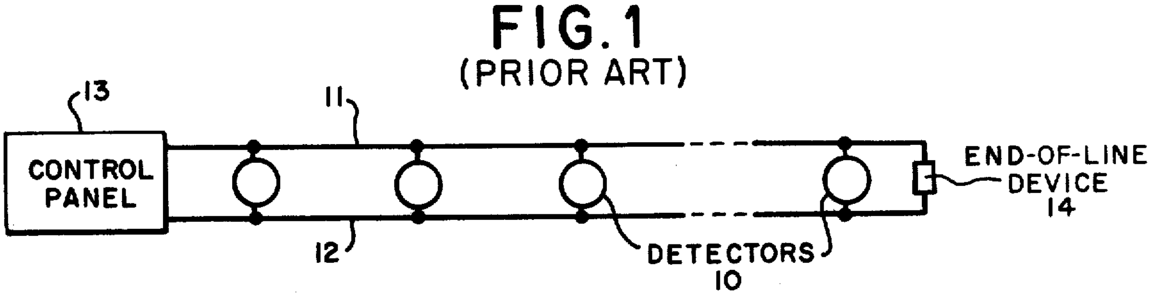
FIG. 2
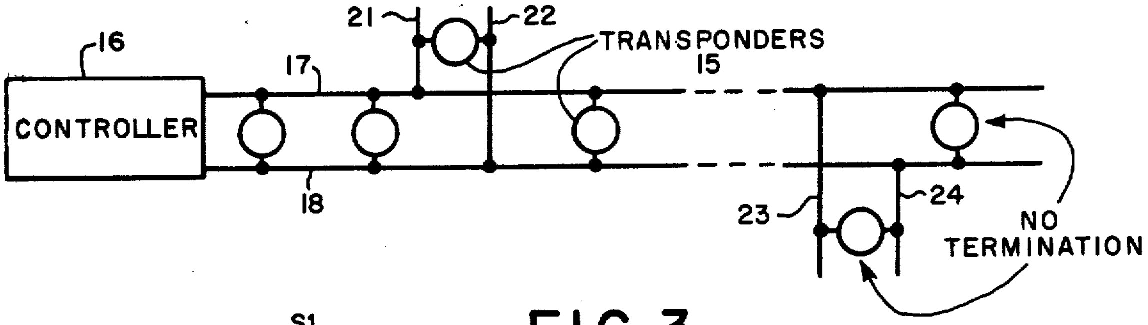
FIG. 3
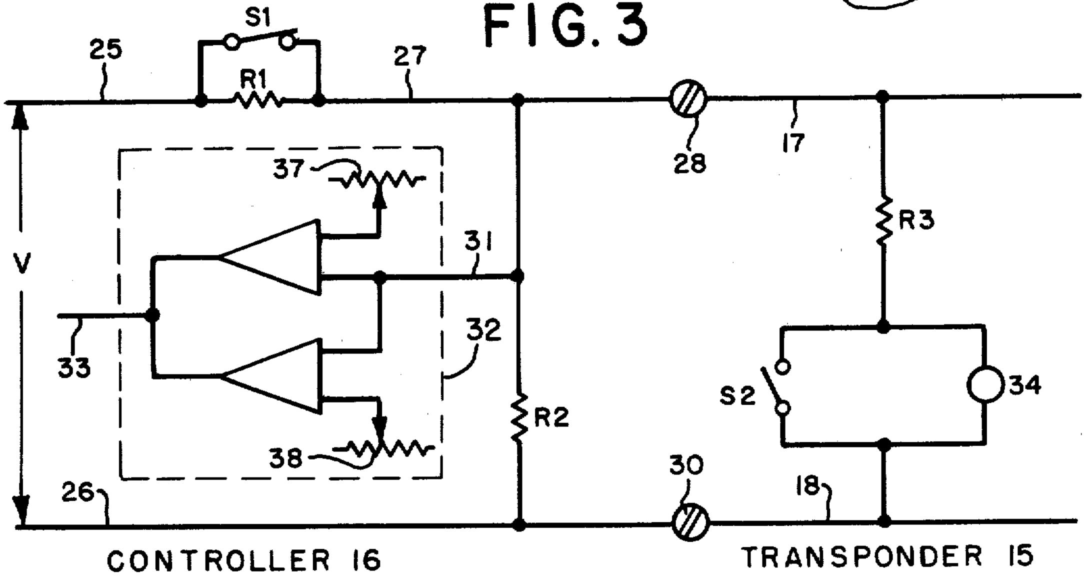
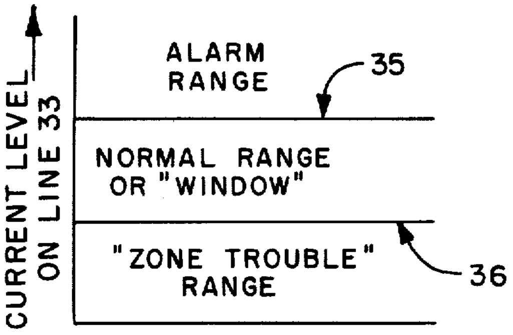
FIG. 4

FIG. 5
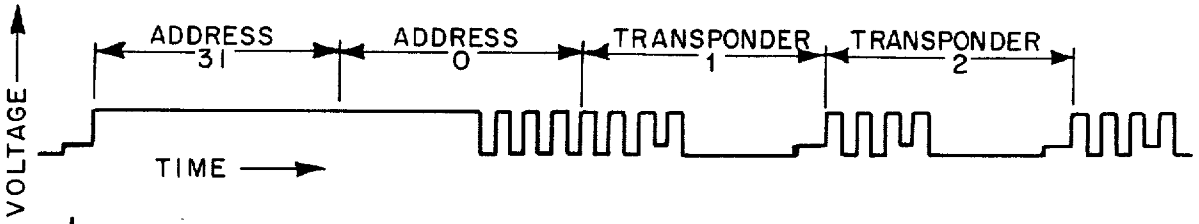
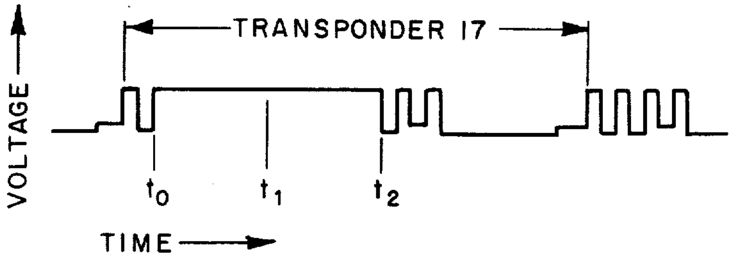
FIG. 6
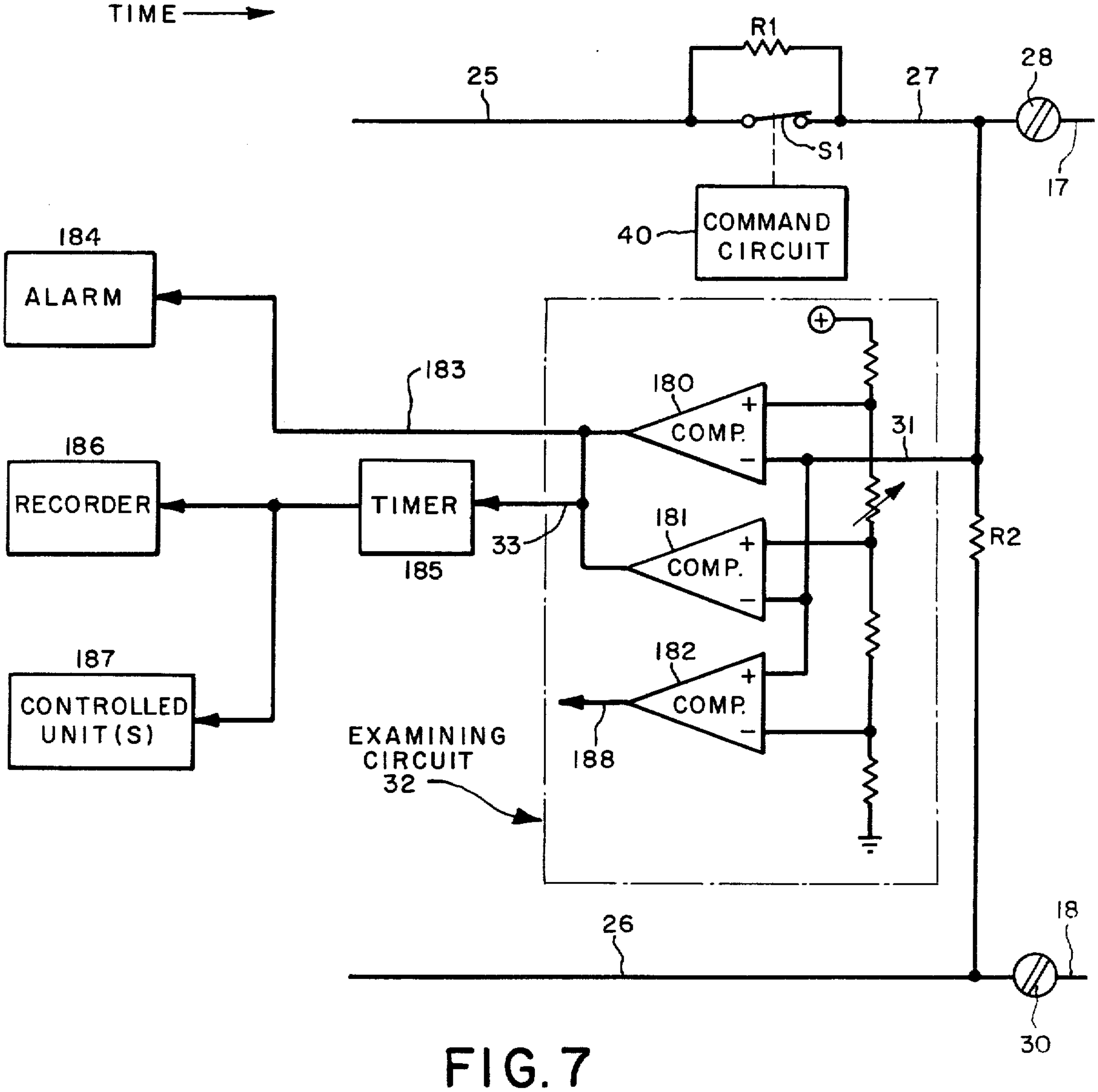
FIG. 7

TRANSPONDER 15

BIDIRECTIONAL, INTERACTIVE FIRE DETECTION SYSTEM

BACKGROUND OF THE INVENTION

Various detectors and systems have been developed to detect and indicate the presence of particles of combustion, or of a fire, or of an increase in temperature. Such systems generally use two or more conductors between a control panel or control unit, which is coupled to the individual detectors. In general, the individual detectors determine when an undesired condition is present, by comparing some parameter (such as current flow or voltage level) with a predetermined reference value. When the detector finds the reference value has been exceeded, this means the undesired condition is present and the detector latches in the alarm condition. Generally the control unit does not know the precise location of the alarmed detector, and after three or more detectors have gone into alarm, cannot recognize how many detectors are in the alarmed condition.

Such prior art detectors are generally not capable of having their sensitivity checked from the control panel, and having their sensitivity individually adjusted directly at ech detector without taking the system out of operation when such adjustment is necessary.

A serious shortcoming of prior art systems is that detectors are frequently made to snap into a base connection across the conductor pair. If the detector is removed and replaced by a cardboard form or some other mechanical unit to simulate detector presence, continuity along the conductor pair is maintained and the control unit does not "know" that the detector is in fact missing from the area.

It is thus a primary consideration of the present invention to provide a bidirectional, interactive fire detection system in which only a single conductor pair is required. In such a system it is desired to have the control panel or controller selectively address the individual devices, and to have each device respond when addressed and commanded to inform the controller of the individual device status.

Another important consideration is the provision of such a system in which the controller issues command signals to the addressed device, which command signals represent desired functions or actions to be taken by the selectively addressed device, which then accomplishes the functions or actions. It is desired to have the comparison and latching functions in the control panel, with the addressed device only communicating signal level information to the control panel, which then determines if an alarm condition is present.

It is another consideration to have each individual device selectively and remotely calibrated, without affecting the operation of such device or the remainder of the system during such adjustment.

SUMMARY OF THE INVENTION

A bidirectional, interactive system for detecting and indicating a predetermined condition, such as the presence of fire or products of combustion, when constructed according to the present invention need employ only two conductors. A control unit and a plurality of transponders are each coupled to the same conductor pair, without any need for an end-of-line resistor or other termination unit. The control unit sends out a series of signal sets, with each signal set or group comprising a plurality of signals or pulses for addressing a particular transponder. Each pulse signal has first and second portions of different amplitude. One or more of the signals in a given group can be modified to pass data to the addressed transponder by modulating a first portion of at least one signal in the given group. Each transponder has a unique address and, when it recognizes its own address and is commanded by a particular data group, can return data to the controller by modulating a second portion of one signal in that same particular data group. The transponder can return data concerning associated apparatus, in addition to other information.

The Drawings

In the several figures of the drawings, like reference numerals identify like components, and in those drawings:

FIG. 1 is a block diagram of a prior art fire detection system;

FIG. 2 is a block diagram of a fire detection and signalling system constructed in accordance with the principles of this invention;

FIG. 3 is a simplified schematic illustration of the controller and one transponder of the inventive system;

FIG. 4 is an illustrative showing useful in understanding operation of the components shown in FIG. 3;

FIGS. 5 and 6 are graphical illustrations useful in understanding operation of the invention;

FIG. 7 is a functional block diagram of a controller constructed in accordance with the invention;

General Background Description

Figure 8:
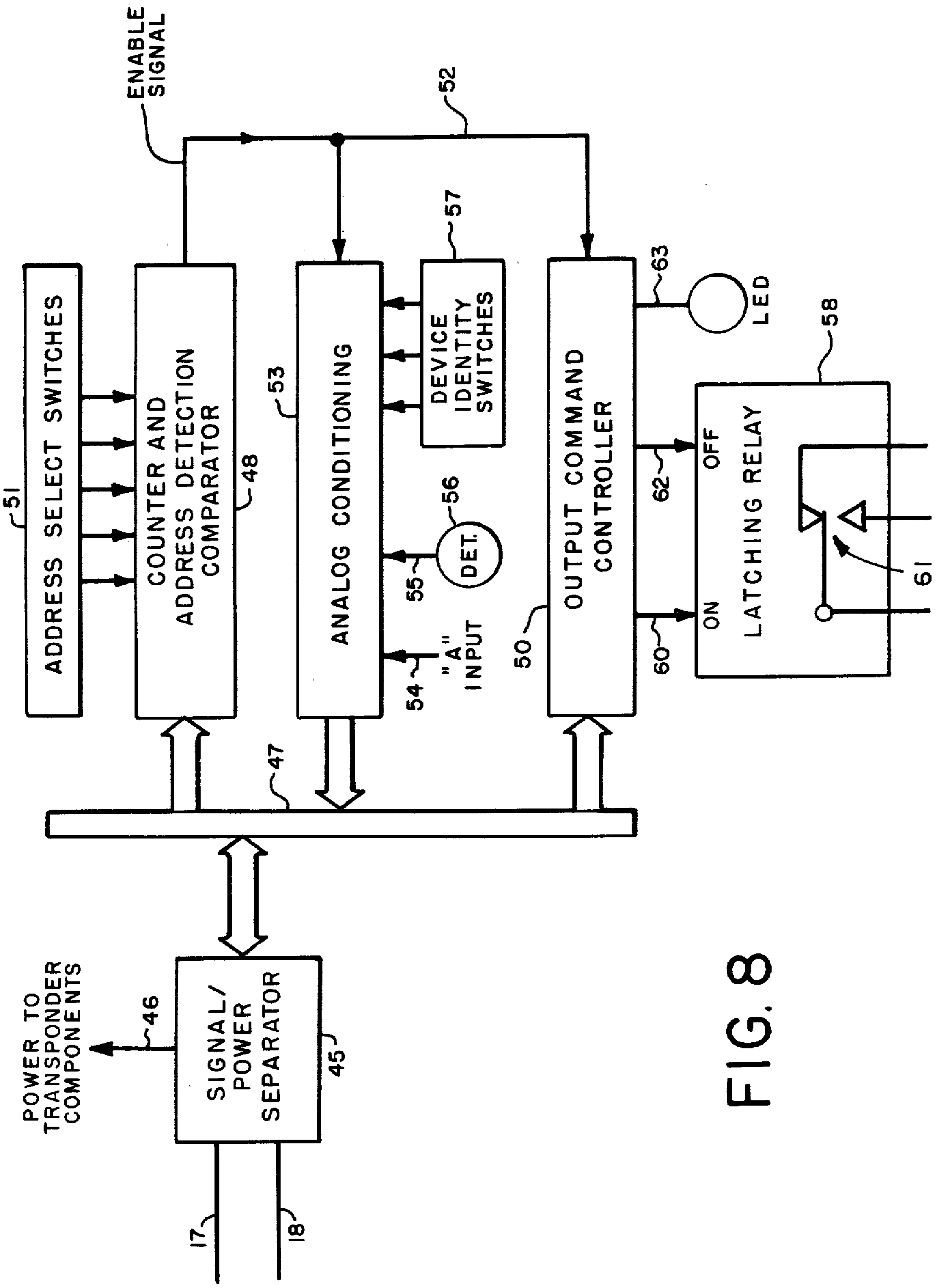
FIG. 8 is a functional block diagram of a transponder in accordance with the present invention.

FIG. 1 depicts a common arrangement of a plurality of detectors 10 coupled between a pair of conductors 11,12. A control panel 13 is coupled to the conductor pair for controlling the system, and an end-of-line device 14 is connected across the conductor pair to provide a termination. This affords continuity of current flow along the lines. In such arrangement the actual detection is accomplished by one of the detectors sensing the fire or presence of particulate matter, going into alarm and providing a change in voltage or current on the conductor pair which is detected at the control panel. With such an arrangement it is not possible to determine the exact location of the alarm condition, but only the loop (completed by conductors 11,12) on which the alarm condition has occurred.

FIG. 2 is a simplified arrangement showing a plurality of transponders 15 rather than simple detectors, connected in accordance with the present invention to operate in conjunction with a controller 16, coupled to the same conductor pair 17, 18 to which the transponders are connected. The term "transponder" as used herein and in the appended claims signifies a unit which monitors some condition adjacent its physical location, is selectively addressed by the controller and recognizes not only its address but additionally other information which may be transmitted from the controller, and itself transmits information regarding the condition sensed (and other information, when directed by the controller) back to the controller. Thus, the transponders 15 are truly interactive with the controller to provide a bidirectional, interactive system. Each transponder is not a passive device which merely transmits some signal when activated by a master transmitter. It is also emphasized that there are no terminations at the end of the conductor pair 17,18, or on either of the other pairs 21,22 and 23,24 which branch off from the main pair 17,18. It will become apparent that such branching is possible with the system of this invention without regard to physical location or the order in which each transponder is addressed. Such an arrangement, with no requirement for termination at the end of any conductor pair, provides a system which is simple and economical to install and operate.

FIG. 3 depicts in simplified form the manner in which interactive signalling is accomplished between controller 16 and one of the transponders 15. As there shown, controller 16 operates with a reference voltage V applied between conductors 25,26. Conductor 25 is coupled through a resistor R1 to conductor 27, which is connected over a connecting screw 28 to conductor 17. Conductor 26 in the controller is connected over screw 30 to line conductor 18. In the controller a switch S1 is coupled in parallel with resistor R1. Another resistor R2, of the same value as R1, is connected between conductors 27 and 26. A sensing conductor 31 has one end connected between resistor R2 and conductor 27, and its other end coupled to the input of a "window" sensing circuit 32. Conductor 33 provides the output signal from window circuit 32.

In the transponder, a resistor R3 has one end coupled to conductor 17, and its other end coupled to a detector 34 and one side of another switch S2. The other side of switch S2 and of detector 34 are coupled to conductor 18. Resistor R3 is the same resistance value as resistors R1 and R2. There are other components in the actual circuit (for example, components to regulate the open and closed times of S1 and S2) but those depicted in FIG. 3 are helpful to understand the basic intercommunication system of the invention.

This interactive communication is accomplished with the modification of some characteristic, such as voltage amplitude or the time duration of a signal, or the modulation of more than one such characteristic. The amplitude of the voltage used in signalling is simply controlled by switches S1 and S2. Switch S1 is closed to "send" each signal in each signal group from the controller over the conductor pair 17,18. With switch S1 closed, a voltage of amplitude V is passed over conductors 17,18 to all the transponders. The duration of switch closure can also be recognized at the transponder, as can the number of times switch S1 is opened and closed in each group of signals or pulses.

With switch S1 open and switch S2 open, the voltage on sense conductor 31 is V/2, determined by the resistance bridge including resistances R1 and R2. Thus when transponder 15 is answering back to the controller, a voltage of V/2 received by window circuit 32 signifies switch S2 is open. When S2 is closed, while S1 remains open, this places R3 in parallel with R2, and this parallel combination is in series with R1 to determine the voltage at conductor 31. Thus with switch S2 closed, window circuit 32 "sees" a voltage level of V/3 returned to the controller. Additionally the number of switch openings and closings are also readily determined in the controller.

The values of R1, R2 and R3 were set equal to each other to simplify the preceding explanation. The invention has also been constructed and successfully tested using a system in which the ohmic values of R1, R2 and R3 are equal. However, those skilled in the art will appreciate that the resistance values of R1, R2 and R3 are not required to be equal.

FIG. 4 indicates in a simplified manner one way in which the different voltage levels produced by selectively opening and closing switches S1 and S2 can be utilized. Using the "window" sensing circuit 32, which can be considered an examining circuit for providing some useful output signal, the different signal ranges shown in FIG. 4 can be determined. For example, the normal operating range or "window" is between the lines 35 and 36 in FIG. 4. If the amplitude of the output signal on line 33 is less than that represented by line 35 but more than the amplitude denoted by line 36, the output from detector 34 (or some other device which provides an analog signal) is within an acceptable range. If device 34 is a combustion detector and the signal on line 33 is above that represented by line 35, then an alarm condition exists adjacent the particular transponder 15 which returned the signal. It is emphasized that this determination is made at the controller by comparing a response information signal with some reference level established by components within the controller. By way of example a pair of potentiometers 37, 38 can be used to adjust the levels 35, 36 of the normal window in the controller. If the output signal on line 33 is greater than zero but less than the amplitude of line 36, it indicates some malfunction of the detector 34. If the output signal is zero, the detector may have been removed from the circuit or otherwise disabled.

By providing an analog output signal over line 33 an additional and important advantage is realized. Not only can the signal examining circuit 32 determine whether the returned signal is within the desired window, but it can determine where in the window the signal falls. This indicates the extent to which the signal must change to enter the alarm range, and thus connotes the sensitivity of the detector. By recording the successive signals received back from a detector, any change in sensitivity will be evidenced from such recording. The aging of electrical components, accumulation of dust, or some other condition could provide a reduction in sensitivity which would be apparent at the conroller before the condition became critical. With this perspective of the general signal transmission and device interaction, a more detailed description will not be set out.

DETAILED DESCRIPTION OF THE INVENTION

To understand the hardware interconnection and operation, a description of the signal groups transmitted from the controller and returned by the receiver will be helpful. FIG. 5 indicates a series of signal groups for sequential passage over line conductors 17, 18 to the different transponders connected across these conductors. Each signal group such as the group shown under the legend "transponder 1", includes the same number of pulses. In a preferred embodiment four pulses were used in each group, but those skilled in the art will appreciate that a different number of pulses can be utilized. The extended pulse at the high amplitude level shown under "address 31" and the first portion of "address 0" indicates a reset action, and is also used to charge up a component in the transponder to provide energization of that transponder throughout the polling cycle. As will become apparent, each transponder includes a counter circuit to accumulate the number of pulse groups sent over the line conductors, and thus recognize when its address is indicated by the controller. All the pulses shown in FIG. 5 are of short duration, signifying that there is no command information sent by the controller but only different addresses, as indicated by the number of pulse groups.

FIG. 6 indicates the manner in which one pulse group is modified to pass command information to a particular transponder. As there shown, when the seventeenth transponder is being signaled, the second pulse in the group has its high level portion extended for a considerable time, which may be 40 milliseconds. The precise time is not critical, because each transponder can include a simple timer to determine when the pulse amplitude has remained high for a minimum time, represented in FIG. 6 by the distance between $t_0$ and $t_1$. This time can be about 20 milliseconds, so that when the transponder recognizes when this minimum time is exceeded, it is being commanded to perform some function or return some information. The transponder can receive different command information by stretching different pulses in the group, and thus the flexibility of the system is substantial. In a similar manner the transponder returns information by extending the zero amplitude portion of its return signal, analogous to an extended closure of switch S2 in FIG. 3. This will be explained in more detail hereinafter.

FIG. 7 depicts one general layout suitable for implementing the functions of controller 16. As there shown a command circuit 40 is connected to selectively open and close switch S1 to provide individual pulses, which collectively form a series of such pulses or signal groups. Regulating the open and closed times of switch S1 correspondingly regulates the time duration of the pulses transmitted over line conductors 17, 18 to the transponders. The command circuit may include a microcomputer on any other suitable type of command circuit can be utilized. Examining circuit 32 is of the type generally shown in FIG. 3, but in FIG. 7 this circuit includes three comparator circuits 180, 181 and 182 for determining the parameters of the "window", described in connection with FIG. 4. If the response signal on line 31 (FIG. 7) is of the level indicating an alarm condition is present at the transponder, comparator 180 switches and produces an output signal which is passed over line 183 to alarm circuit 184, providing an alarm, (audible, visual, or any other suitable indication). If the signal received on line 31 is within the normal range or "window", this is determined by comparators 180 and 181, and a "normal range" output signal is passed over line 33 to timer circuit 185, and from there to both recorder 186 and to one or more controlled units represented by block 187. Timer circuit 185 is used to indicate the time duration of the signal within the normal range, thus to determine which controlled unit is to be actuated or what other function is commanded by the signal returned from the transponder. If the returned signal is below the normal range, within the "zone trouble" range depicted in FIG. 4, then a signal is provided by comparator 182 in FIG. 7 and passed over line 188 to any suitable equipment (not shown) to signal that either multiple transponders have replied during the same time interval, or there is a short circuit between the lines 17, 18. It is important to note that the signal examining circuit 32 can provide not only an indication that the return signal is within the normal or acceptable window, or above this window in the alarm range, but also can "tell" the controller that there is a trouble condition on the line caused by multiple response or a short circuit.

FIG. 8 depicts the functional arrangement by which received signals issued by the controller are processed with any transponder. As there shown signals received over the line conductors 17, 18 enter the signal/power separator 45, which effectively passes a d-c energizing potential difference for the transponder components over line 46 to the individual ones of those components. Those skilled in the art will appreciate that the line 46 may represent several conductors, such as a ground conductor, a conductor with 5 volts with respect to ground, another with 12 volts with respect to ground, and so forth. Signals received from the line conductors are passed from the separator 45 to common bus 47, which in turn passes the signals to an address detection circuit 48 and an output demand controller 50. A plurality of address select switches represented by block 51 are individually coupled to address detection circuit 48. The switches are simple on-off switches, each of which can be set in the open or closed position to collectively determine the address of the specific transponder in which the circuit is located. With five switches up to 32 addresses can be individually assigned by opening and closing different ones of the switches. Thus these switches represent circuit means for determining the unique address of the transponder in which the switches are located. A comparator or other arrangement within detection circuit 48 recognizes coincidence of the address received over bus 47 from the line conductors with the unique address set by switches 51 and, upon recognizing this coincidence, provides an enable signal over line 52 to both the analog conditioning circuit 53 and the output command controller 50.

The analog conditioning circuit 53 includes means for recognizing when command information has been received from the controller, as by determining the pulse duration of the received signal in each group. Analog conditioning circuit 53 also receives a first analog signal over conductor 54, and a second analog signal over conductor 55. The received analog signal can be any type of information-connoting signal. By way of example, a detector 56 is shown coupled over conductor 55 to analog conditioning circuit 53. When the circuit is directed to return to the controller information concerning the analog signal received over line 55, the analog conditioning circuit transmits the response information signal, generated as a function of the analog signal received over conductor 55, over bus 47 and the signal/power separator 45 to the line conductors, and thence to the controller. In this way the sensitivity level of the particular detector can be monitored in every cycle of operation if that is desirable or necessary under given conditions. A plurality of device identity switches 57 are also shown coupled to analog conditioning circuit 53. Like the other switches 51, identity switches 57 are simple open-closed or on-off switches which can be set to provide a numerical combination (from 1 through 8) to identify the component (such as detector 56) responding over the line conductors. By way of example, the setting of these switches can identify the unit as an ionization detector, an obscuration detector, an instrument signifying the air velocity in a duct, a temperature-indicating unit, or some other device. The analog conditioning circuit also passes the signal indicating a particular command has been recognized over bus 47 to output command controller 50, which is also enabled at this time over line 52. This controller can accomplish various functions. By way of example, one signal can regulate the electromechanical actuator 58, shown as a set-reset or on-off latching relay, to turn on. A signal over line 60 can effect this and displace the illustrated contacts at 61 from the position shown to the alternate position. A signal from controller 50 passed over conductor 62 can displace the contact set to the de-energized or illustrated condition, if it is already actuated. Another possibility is to pass an output command signal over line 63 to illuminate a signal lamp, such as a light-emitting diode (led).

Figure 9:
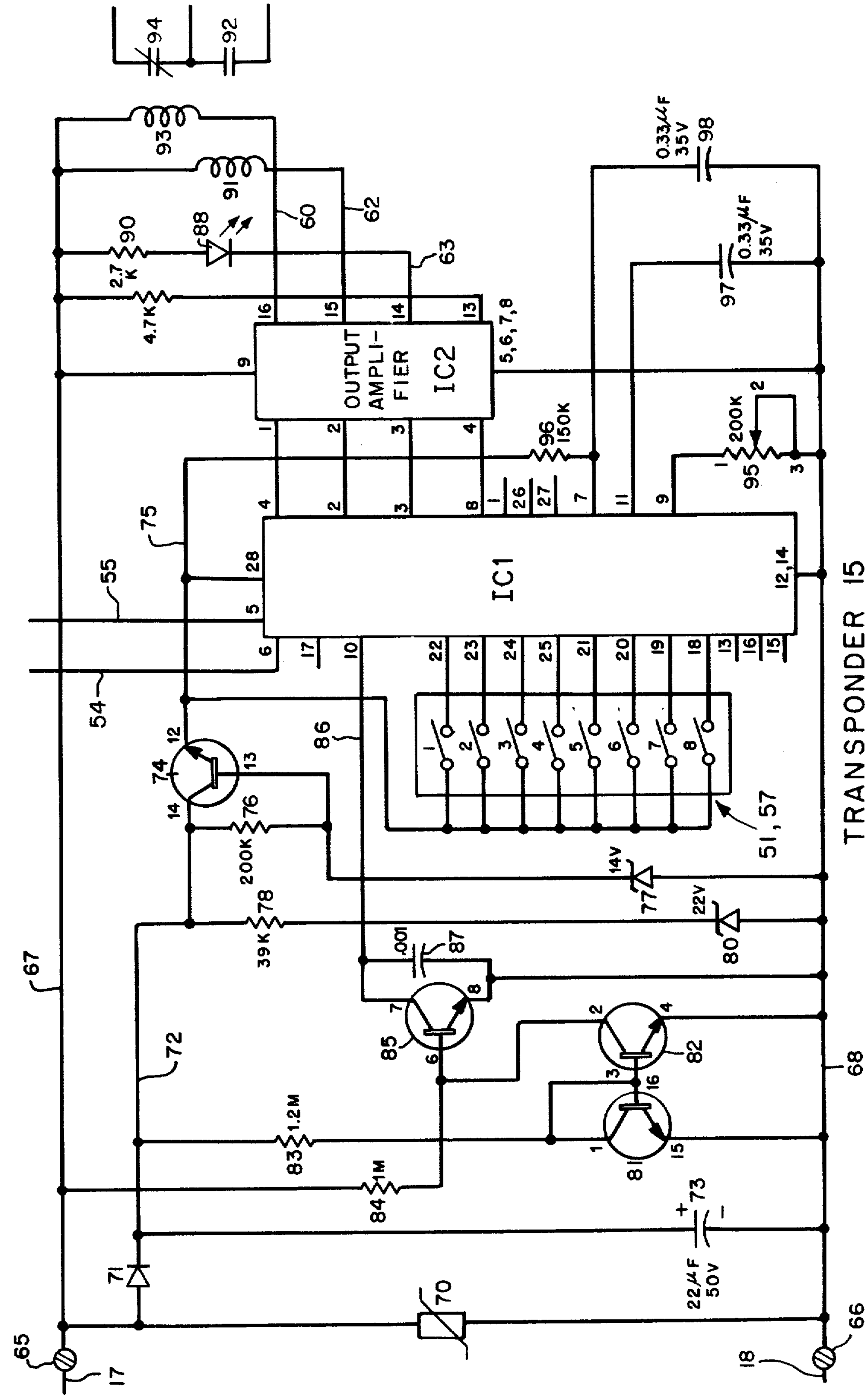
FIG. 9 is a schematic diagram of a transponder used in one embodiment of the invention.

A basic schematic of a transponder suitable for operation with the present invention is shown in FIG. 9. A pair of screw-type terminals 65, 66 connect the line conductors 17, 18 to conductors 67, 68 of the transponder. A surge protector 70 is coupled between conductors 67, 68 to protect the transponder components from transients on the line. A diode 71 is coupled between signal line 67 and power line 72 of the transponder. A capacitor 73 has one side coupled to conductor 68 and its other plate coupled to the common connection between power conductor 72 and the cathode of diode 71. When a long positive-going pulse is received at the transponder, current flows through diode 71 to charge capacitor 73, and this voltage is applied to the collector of an NPN type transistor 74. This transistor is connected as a series regulator to provide a regulated output voltage on conductor 75. A resistor 76 is connected between the collector and the base of transistor 74, and the base is also coupled through a Zener diode 77 to conductor 68. Another series circuit, comprising a resistor 78 and a Zener diode 80, is coupled between the collector of transistor 74 and conductor 68.

NPN type transistors 81, 82 are connected in a Norton amplifier configuration so that the current flow through transistor 82 is a mirror of the current flow through transistor 81. A resistor 83 is coupled between conductor 72 and the common connection of the collector of transistor 81, and the bases of both transistors 81 and 82. Another resistor 84 is coupled between conductor 67 and the common connection between the collector of transistor 82, and the base of another transistor 85 which assists in shaping the pulses passed from its collector over conductor 86 to input connection 10 of integrated circuit 1 (IC1). A capacitor 87 is coupled between collector and base of transistor 85.

When the pulse or individual signal on line conductors 17, 18 is low, operation of the Norton amplifier is such that current flows from collector to base in transistor 82, drawing current away from the base of transistor 85 which remains non-conducting. When the pulse signal on the line conductors goes high, the signal on conductor 72 goes high and this is passed through the 1.2 megohm resistor 83 to the bases of transistors 81, 82, which continue to conduct. Resistor 84 is a 1 megohm resistor, and since it is smaller than resistor 83, a larger current is provided to the base of transistor 85 than flows through transistor 82, and thus transistor 85 is gated on. This provides a positive-going signal over conductor 86 to pin 10 of IC1.

Other input signals are provided to IC1 from the arrays of on-off switches 51, 57 shown to the left of IC1. The first array includes switches 1–5 which are the address select switches 51. These are set (by selective opening and closing before the equipment is energized) to determine the unique address of each transponder. The second array includes switches 6–8, which are the device identity switches 57. These are set according to the particular components (not shown) which are coupled individually to the conductors 54 and 55 to provide the A and B analog input signals to the integrated circuit. When an output command is issued by the transponder circuitry, the appropriate signal is passed over one of the conductors 60, 62 or 63. An output signal from output amplifier IC2 passed over line 63 energizes the led 88, coupled in series with a resistor 90. An output signal on line 62 is effective to energize the "set" winding 91 of latching relay 58 and to close the normally open contact set 92 of this relay. An output signal over conductor 60 energizes the reset winding 93 of the relay to open the normally-closed contact set 94 of the relay. Other components such as variable resistor 95, fixed resistor 96, and the capacitors 97, 98 are useful in connection with the circuitry of IC1. A general functional description of the IC1 circuitry is set out below.

Figure 10:
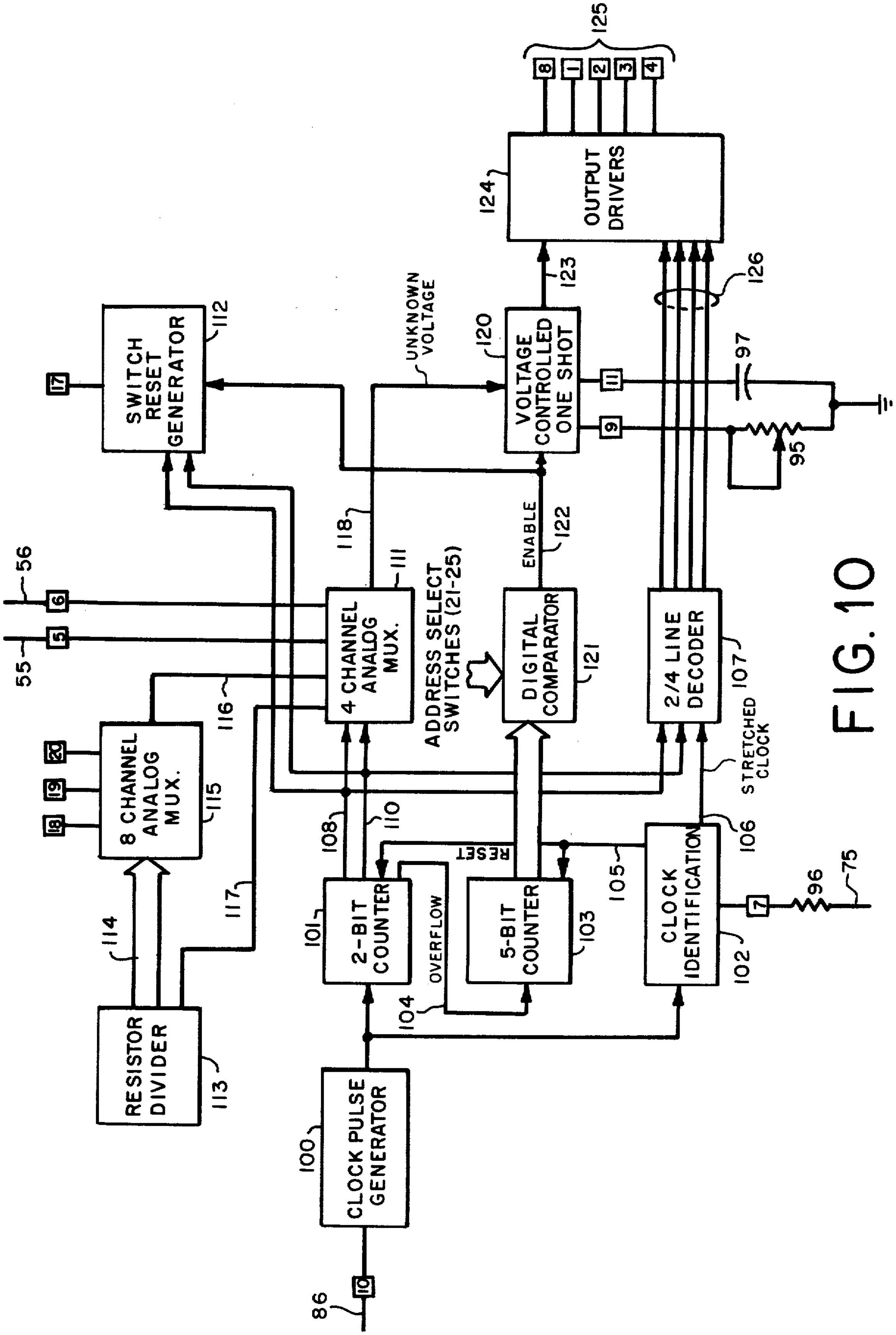
FIG. 10 is a functional block diagram of an integrated circuit useful in the transponder of FIG. 9.

As shown in FIG. 10, the signal pulses in each group received at the transponder are passed over line 86 to clock pulse generator stage 100 in IC1. This stage includes conventional shaping circuitry, such as a comparator which changes state with a positive-going inut pulse and a Schmitt trigger. The clock pulse generator provides its output to a 2-bit counter 101 and a clock identification circuit 102. The clock identification circuit also receives the reference voltage from resistor 96 and conductor 75 shown in FIG. 9. A 5-bit counter 103 is connected to receive overflow pulses over line 104 from the 2-bit counter 101. In one embodiment both counters were implemented in a single device of the 4040 type. When the incoming pulses go low, clock identification circuit 102 provides a reset pulse over line 105 to both counters 101 and 103. When the incoming pulse remains high beyond a preset time, a "stretched clock" identification pulse is passed over line 106 to a 2-to-4 line decoder circuit 107.

The 2-bit counter 101 provides a "clock decode" output signal on its output conductors 108, 110. Basically this signal "tells" the associated equipment which of the controller pulses has remained high longer than the preset time period, and thus identifies which of the several possible commands is to be executed by the transponder. This signal is passed to 2-to-4 line decoder 107, the 4-channel analog multiplexer 111, and a switch reset generator 12. The switch reset generator is operative to provide a control pulse longer by a predetermined safety factor than the polling cycle for all the transponders. This signal is used to ensure that a momentary type control signal, such as a thermostat opening or closing, is not missed if the transponder is being addressed to determine whether that contact set has been switched.

A resistor divider circuit 113 is provided to develop reference voltages, most of which are applied over a plurality of conductors represented by bus 114 to an 8 channel analog multiplexer 115. In a preferred embodiment this unit was a 4051 device, connected to receive the device identification signal over connections 18, 19 and 20 according to the setting of the device identity switches. The output from multiplexer 115 is passed over line 116 to the 4-channel analog multiplexer, which also receives a signal over line 117 from the resistor divider array 113. Multiplexer 111 also receives the analog A and analog B signals over conductors 54 and 55. The output of multiplexer 111 is passed over line 118 to a voltage-controlled one-shot stage 120, which has connections as shown to the variable resistor 95 and capacitor 97 in the lower right portion of FIG. 9.

A digital comparator circuit 121 which is comprised of a plurality of exclusive NOR circuits, is connected to receive a output from 5-bit counter 103 and an input from the address select switches 51. Upon recognition of coincidence between the unique transponder address determined by these switches and the address represented by the pulses transferred from counter 103, digital comparator 121 passes an enable signal over line 122 to a voltage-controlled one-shot 120. This stage in turn functions to provide an "energize" output signal on line 123 which is amplified in the appropriate one of the output drivers 124, and passed over the selected one of the output connections 125 to output amplifier IC2 in FIG. 9. Which of the lines is selected is determined by the group of signals received over conductors 126 from the 2-to-4 line decoder 107.

The foregoing functional description is sufficient not only to enable one skilled in the art to provide an appropriate specific circuit design for IC1 in FIG. 9, but by explaining the entire functional sequence, it further enables one skilled in the art to implement the circuit operations with various circuits, or to regulate different output functions as may be desired.

Technical Advantages

The present invention provides a truly interactive system with communication from a control panel to the individual transponders, and then back from the transponders to the controller. The duration of the high-amplitude pulse width from the control panel can "tell" the addressed transducer to do nothing, signified by a short duration pulse; a medium duration pulse commands the transponder to produce an output of some kind; and a long duration pulse resets the system. When the transponder responds, the pulse length is proportional to the analog voltage at the output of the transducer (such as the analog A and B signals on lines 54, 55), unless the response is terminated by the controller. This manifests the interactive, bidirectional aspect of the system wherein the analog value is transmitted by controlling the pulse duration. The analog signal is converted to a digital format (in the multiplexer 111 (FIG. 10) ultimately producing a voltage (on line 118) which regulates the duration of the pulse produced by voltage-controlled one shot stage 120. In this way the resultant signal on line 123 has a time duration which is a function of the particular analog signal received from the transducer, which may be several thousand feet distant from the transponder itself.

In addition to returning these controlled pulse durations representative of the analog signals, each transponder can also provide a reference voltage, and a voltage identifying the responding unit or the transducers coupled to the unit. The returned reference voltage can be measured and stored in the controller and, by subtracting this voltage from the alarm threshold level, the controller continuously evaluates the sensitivity of every transducer in the system. This is in marked contrast to present systems which require an operator to disable the system and artificially force a voltage change at the transducer until it goes into alarm. With the bidirectional circuit of this invention all the transducers on a loop can be in alarm simultaneously and this will be detected by the controller.

Known systems generally supervise only the lines to the detectors. In addition to this type of supervision, the present invention supervises four additional sources of possible trouble, providing a distinct return signal to the controller to identify the particular trouble. These failure types are (1) a discontinuity in the wires between a transducer and its associated transponder, (2) a failure of a component in the transducer itself, (3) a failure of a component in the transponder itself, and (4) a determination of the location when there is a failure of the loop. It is emphasized that trouble indications can be latched in the control panel, so that even intermittent failures or discontinuities can be detected and isolated.

In contrast to prior art systems, the present invention allows parallel branching and does not require an end-of-line device. Thus, systems already installed can be expanded at any time and in any direction. The present system has been successfully tested with up to 30 transponders with a polling signal time of about 2 seconds. The loop constructed in accordance with the present invention is capable of supporting up to 240 transponders, with polling speed as the only limiting factor in such arrangements.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A bidirectional, interactive signalling system comprising a pair of electrical conductors, a controller coupled to said conductors, for transmitting a series of signal groups sequentially over said conductors, each signal group comprising a plurality of pulse signals, each pulse signal having first and second portions of different amplitude; and a plurality of transponders, each coupled to said conductors, each transponder having its own unique address, with each of said transponders being connected to recognize as its address a particular signal group in the series of signal groups transmitted from the controller, and to respond upon recognition of its unique address by transmitting data back to the controller over the same conductor pair, which data may include information regarding a predetermined condition such as alarm and/or trouble, in which said controller transmits one or more commands to a selected one of the transponders by modulating a first portion of at least one signal in the signal group directed to the selected transponder, and the selected transponder replies by modulating the second portion of at least one pulse signal in the same signal group to encode data selected for return to the controller.

2. A signalling system as claimed in claim 1, in which the information returned by the selected transponder is encoded by modulating one or more characteristics of one or more signals within the particular signal group returned to the controller.

3. A bidirectional, interactive signalling system, comprising a pair of electrical conductors, a controller coupled to said conductors, for transmitting a series of signal groups sequentially over said conductors, in which each signal group comprises the same number of pulse signals, each pulse signal having a high amplitude portion and a low amplitude portion, and at least one pulse signal has a high amplitude portion modified by extending its time duration to signify command information, and a plurality of transponders, each coupled to said conductors and each transponder including a counter, circuit means determining its own unique address, and means operative upon recognizing coincidence of its own address with the address represented by the number of signal groups sent by the controller to enable the transponder to respond by transmitting data back to the controller over the same conductor pair, which data may include information regarding a predetermined condition such as alarm and/or trouble, in which said controller transmits one or more commands to the enabled transponder by extending the time duration of the high amplitude portion of at least one signal in the signal group directed to the selected transponder, and the selected transponder replies by extending the low amplitude portion of one of the pulse signals in the same signal group to encode the data selected for return.

4. A signalling system as claimed in claim 3, in which each transponder includes means for receiving an analog signal from an attached device and for transmitting a selected data signal, which is a function of the received analog signal, to the controller when the transponder is enabled and commanded to transmit the data signal.

5. A signalling system as claimed in claim 4, in which the controller includes command means for selectively modifying a high amplitude portion of at least one signal in a signal group in a manner to convey at least one command to the enabled transponder.

6. A signalling system as claimed in claim 4, in which the controller includes means for examining the received data signal to determine whether a predetermined condition is present.

7. A signalling system as claimed in claim 4, in which the controller includes recording means for establishing a record of successive data signals received from the same transponder and thus providing a continuing indication of the sensitivity of the device producing said analog signal.

8. A bidirectional, interactive signalling system for detecting and indicating a predetermined condition, comprising a pair of line conductors, a controller coupled to said conductors, for transmitting a series of signal groups sequentially over said conductors, said controller comprising a pair of input conductors across which a voltage V is applied, a first resistor coupled between one of said input conductors and one of said line conductors, means for coupling the other of said input conductors to the other of said line conductors, a second resistor connected between the line conductors at the output side of the controller, a first switch coupled in parallel with the first resistor to short out the first resistor when the switch is closed and pass a voltage V to the line conductors, and circuit means connected to provide a response in accordance with the voltage across the second resistor, and a plurality of transponders, each coupled to said conductors, each transponder having a series circuit comprising a third resistor and a second switch coupled between the line conductors, all of said resistors having substantially the same resistance value, so that with both switches open a voltage V/2 appears across the second resistor, and with the first switch open and the second switch closed a voltage V/3 appears across the second resistor.

9. A bidirectional, interactive signalling system as claimed in claim 8, in which said controller includes means for regulating opening and closing of the first switch to provide said series of signal groups in which each group has the same number of signal pulses, each pulse having a high amplitude portion and a low amplitude portion, closure of said first switch establishing the high amplitude pulse portion by applying a voltage V across said second resistor, irrespective of the position of the second switch, and opening of said first switch establishing the low amplitude pulse portion across said second resistor at a voltage V/2 when said second switch is open and at a voltage V/3 when said second switch is closed.

10. A bidirectional, interactive signalling system comprising a pair of electrical conductors, a controller coupled to said conductors, for transmitting a series of signal groups sequentially over said conductors, in which each signal group comprises the same number of pulses, each pulse having a high amplitude portion and a low amplitude portion, and including command means for selectively extending the time duration of different ones of the high amplitude portions of said pulses in different pulse groups to provide command information, and a plurality of transponders, each coupled to said conductors and each transponder including a counter, circuit means for determining its own unique address, means operative upon recognizing coincidence of its own address with the address represented by the number of signal groups sent by the controller to enable the transponder to respond to such command information as may be received from the controller, means for receiving an analog signal related to a predetermined condition, and means for transmitting response information, which is a function of the received analog signal, to the controller when the transponder is both enabled and commanded to transmit the response information by selectively extending the time duration of the low amplitude portion of at least one pulse in the same pulse group which contains the command information for the responding transponder.

11. A signalling system as claimed in claim 10, in which the transponder circuit means for determining the address is adjustable to set a desired address in any of the transponders.

12. A signalling system as claimed in claim 10, in which each transponder includes means adjustable to provide an identification signal for transmission to the controller in the same pulse group which contains the command information for the responding transponder, to provide identification of the device forwarding the analog signal to the enabled transponder.

13. A signalling system as claimed in claim 10, in which each transponder includes a signal lamp for selective illumination upon receipt of predetermined command information from the controller.

14. A signalling system as claimed in claim 10, in which at least certain ones of said transponders include an electromechanical actuator connected to be operated in response to receipt of predetermined command information from the controller.

15. A signalling system as claimed in claim 14, in which said electromechanical actuator is a set-reset relay, and the relay is set in response to a first type of command information and is reset in response to a different type of command information.

16. A signalling system as claimed in claim 10, in which a detector for particles of combustion is connected to provide said analog signal to the transponder, and the controller includes an examining circuit for determining, from the response information, whether an alarm condition exists at said detector.

17. A signalling system as claimed in claim 16, in which said examining circuit also determines the sensitivity of the detector from the response information.

18. A signalling system as claimed in claim 16, in which said examining circuit also determines from the response information whether the detector is coupled to its associated transponder.

19. For use in a bidirectional, interactive signalling system in which a series of data groups are sequentially passed over a pair of line conductors, each data group having the same number of pulses and each pulse having a high amplitude portion and a low amplitude portion, each data group carrying command information encoded by modifying a high amplitude portion of one or more pulses in each group, the improvement which comprises a transponder, coupled to said line conductors and including a counter, circuit means determining its own unique address, means operative upon recognizing coincidence of its own address with the address represented by the number of data groups sent over the line conductors to enable the transponder to provide response information, and means for transmitting the response information over the line conductors in the same data group in which the transponder is both enabled and instructed to transmit the response information by modulating a low amplitude portion of at least one signal in the signal group directed to the enabled transponder.

* * * * *